United States Patent [19]

Sage

[11] 3,752,188
[45] Aug. 14, 1973

[54] VALVE WITH CONTROLLED FLOW CHARACTERISTICS

[76] Inventor: Alexander Sage, 112 W. Jersey St., Elizabeth, N.J. 07202

[22] Filed: Mar. 30, 1971

[21] Appl. No.: 129,489

[52] U.S. Cl............................ 137/625.12, 137/625.3
[51] Int. Cl............................................... F16k 1/52
[58] Field of Search.................... 137/625.3, 625.12; 251/205, 206

[56] References Cited
UNITED STATES PATENTS

| | | | |
|---|---|---|---|
| 2,596,534 | 5/1952 | Crake | 137/625.12 |
| 2,918,087 | 12/1959 | Curran | 137/625.3 |
| 2,117,182 | 5/1938 | Lewis | 137/625.3 |
| 2,541,176 | 2/1951 | Rockwell | 137/625.3 |
| 853,803 | 5/1907 | Kinander | 137/625.12 |
| 2,615,671 | 10/1952 | Landon | 137/625.3 X |
| 3,112,764 | 12/1963 | Anderson et al. | 137/625.3 X |

FOREIGN PATENTS OR APPLICATIONS

| | | | |
|---|---|---|---|
| 356,377 | 1931 | Great Britain | 137/625.12 |
| 8,454 | 1896 | Sweden | 137/625.3 |

Primary Examiner—Arnold Rosenthal
Attorney—Wigman & Cohen

[57] ABSTRACT

This disclosure relates to a valve having a cylindrical flow restricting element housed therein. Ports formed in the flow restricting element are progressively and cumulatively exposed to the flow of fluid thereby controlling flow through the valve. The ports are of a predetermined configuration such that the flow area varies as a characteristic function of the length of the axial movement of the flow restricting element.

10 Claims, 5 Drawing Figures

FLOW AS A FUNCTION OF STEM MOVEMENT
$A = f\sqrt{L}$

INVENTOR
ALEXANDER SAGE

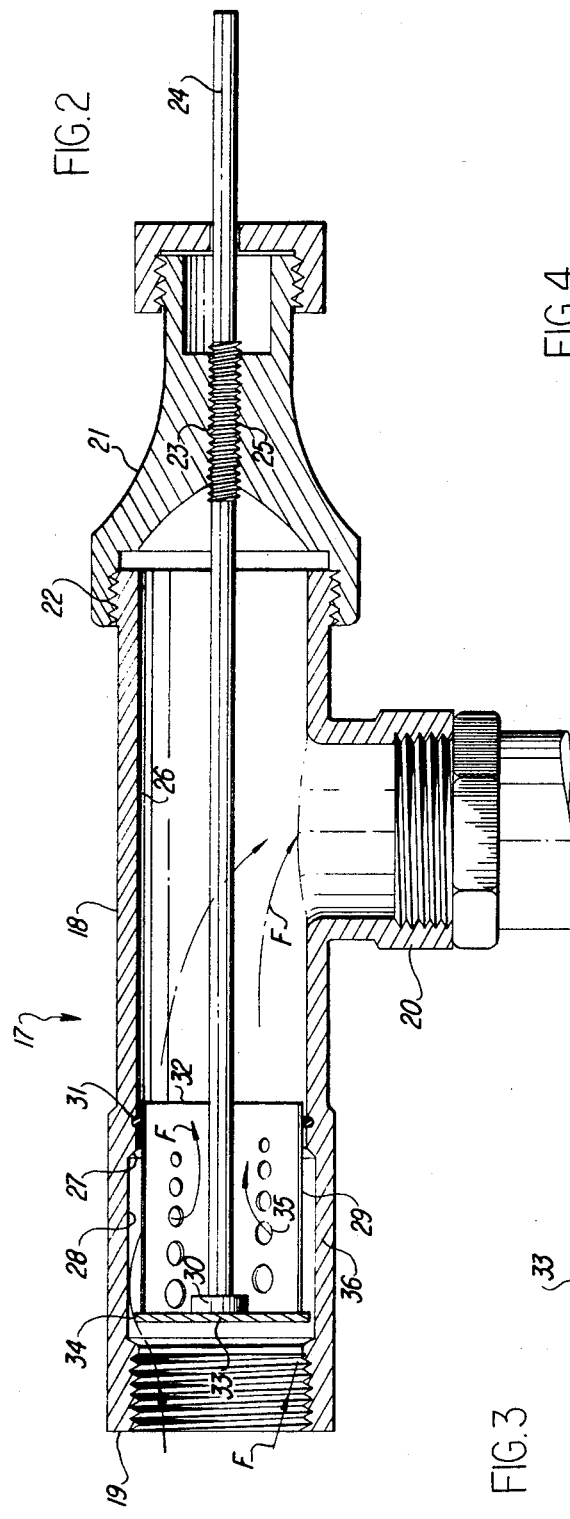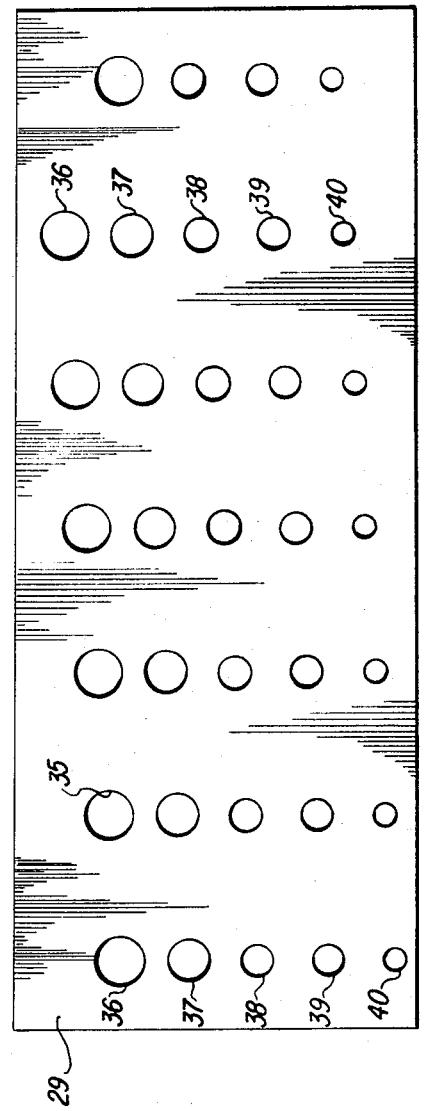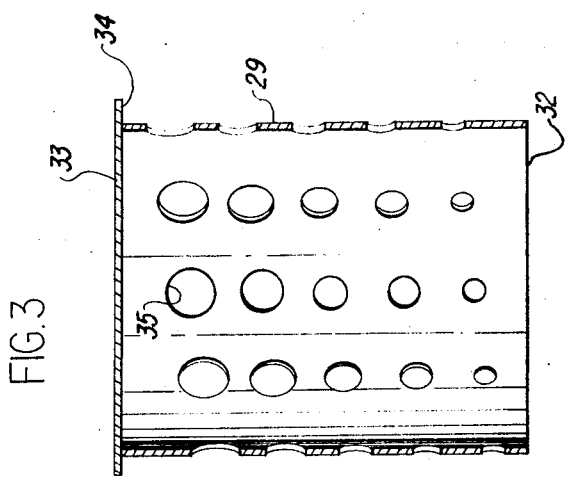

VALVE WITH CONTROLLED FLOW CHARACTERISTICS

This invention relates generally to fluid handling, and more particularly to a valve for obtaining precise control of the fluid flowing therethrough, as well as a characteristic flow pattern.

The requirement for precise control of fluid flow proportional to various functions has become increasingly frequent in present-day industry. The most common use of valves operating in accordance with controlled functions is in the chemical industries; including, for example, the manufacture of fine chemicals, drugs, plastics and hydrocarbons. The petrochemical industry alone uses hundred of thousands of control valves in various apparatus and applications. More specifically, control valves may be used for the blending of two or more fluids, the control of temperature by varying the flow of hot or cod fluids in heat transfer relation with process materials, pressure control, level control, pH control, and many other applications.

Control valves utilized in dynamic applications are generally responsive to a sensing device, such as a thermostat or pressure gauge, which senses a condition in the system and in response thereto transmits a signal to the control valve to vary the flow in accordance with the predetermined parameters. Generally, the sensed condition is intended to remain within a specified range, and the purpose of the control valve is to vary the flow in order to maintain equilibrium. The condition in which the system is at equilibrium is known as the setpoint.

Prior art valves used for this type application, such as needle valves, butterfly valves and ball valves, have, by the nature of their operation, certain undesirable characteristics. When the valve is only slightly open, a small movement of the valve stem produces either zero flow, or suddenly produces a much larger flow than desired. Therefore, at the point at which the smallest change in flow is required, a large volume is introduced causing an overreaction to the change desired. The valve must then move in the other direction to correct for the overreaction. The same thing then occurs again in reverse. The condition that results is known as "hunting," where an instrument is attempting to make a small change and keeps overshooting its mark. A similar condition in reverse occurs when the valve is almost fully open.

Prior art control valves regulate the flow of fluid by continually overreacting in one direction and then the other. This produces a condition where the controlled system is maintained not at the setpoint, but within a range above and below the setpoint; an undesirable condition. Various devices, commonly known as proportional plus rest plus rate devices, have been developed to correct for this range fluctuation. Although these devices are relatively satisfactory, they add considerable cost to the apparatus and include sensitive parts which require extensive maintenance and frequent calibration.

Another problem with prior art valves, particularly the so-called needle valve, is that in systems requiring precise control, the valves are mechanically unreliable to reproduce a constant flow area. For example, should there by any radial shifting of the needle point in the annular flow passage of the valve, this will result in the annular space between the needle point and the valve housing becoming "out of round". When the needle valve is in a given position, should the radial position of the needle point shift completely to one side, the flow through the annular space will approach 2½ times the flow that occurs when the needle is precisely positioned in the center of the passage. It is apparent, therefore, that flow through the valve is unpredictable and non-repeatable as a result of even the slightest radial shift of the needle in relation to its annular seat.

One method of overcoming the shortcomings of the needle valve is disclosed in U.S. Pat. No. 3,384,338 to D.J. Dermody. This patent discloses a control valve having a housing formed with a fluid passageway and an axially movable flow restricting element threadedly interengaged in the passageway. A slot formed in the flow restricting element defines a variable area orifice that is not subject to the mechanical unreliability of the needle valve and thus results in a valve permitting relatively precise control. The valve, however, must be machined to close tolerances and is thus relatively expensive to manufacture. Moreover, the structure of the slotted flow passage lends itself to becoming easily clogged and hence not desirable for use with unfiltered or particulate material flow.

Another variable area valve is disclosed in U.S. Pat No. 3,080,885 to W. G. Webster et al. The valve disclosed in this patent is similar to the needle valve insofar as it uses a flow restricting element axially movable in a hosing defining an annular flow passage. This valve is relatively complicated and utilizes two metering orifices as well as accurately machined housing and valve bodies to achieve precisely characterized flow.

Still another variable area valve is disclosed in U.S. Pat. No. 3,010,695 to G. W. Banks. The valve disclosed in this patent utilizes a plurality of characterization ports which may be exposed to the fluid flow thereby achieving the flow characteristics required of the valve. The characterization ports, however, must be accurately machined to precise shapes such as triangles and rectangles. Moreover, the degree of control is relatively limited inasmuch as the design of the characterization ports lends itself to great percentage changes in flow area for corresponding relatively small linear movements of the valve.

It is apparent, therefore, that prior art approaches to the problem of precise control of fluid flow, such as those described above, have failed to produce a valve that is both simple and economical to manufacture and operate, as well as being susceptible to precise control over a wide range of flow values.

It is, therefore, a primary object of this invention to provide a valve with controlled flow characteristics that is simple and economical to manufacture.

More particularly, it is an object of this invention to provide a variable area valve whereby the volume of fluid flowing therethrough may be precisely controlled without the need for elaborate auxiliary control devices.

Another object of this invention is to provide a control valve including variable area flow conducting means having a predetermined configuration such that the area thereof through which flow may be conducted may be varied as a predetermined function of the length of the axial movement of the valve element.

Briefly, these objects are accomplished by providing a valve comprising a casing having a fluid inlet and a fluid outlet; and a hollow cylindrical valve body, closed at one end, axially movable in the casing between the inlet and outlet. A plurality of flow-conducting apertures of different predetermined cross-sectional areas are provided in the valve communicating between the inlet and the outlet. The flow through the valve is controlled by selectively exposing any number of the apertures to the flow of fluid.

With the above and other objects in view that may hereinafter appear, the nature of the invention may be more clearly understood by reference to the several views illustrated in the accompanying drawings, the following detailed description and the appended claimed subject matter.

IN THE DRAWINGS:

FIG. 2 is a vertical longitudinal sectional view taken through the control valve;

FIG. 3 is an enlarged vertical sectional view taken through the cylindrical valve body and depicts the flow-conducting apertures formed therein;

FIG. 4 is a developed plan view of the cylindrical valve body and more clearly depicts the several generally horizontal rows of apertures, and the increasing cross-sectional areas thereof in each succeeding row.

Figure 1:
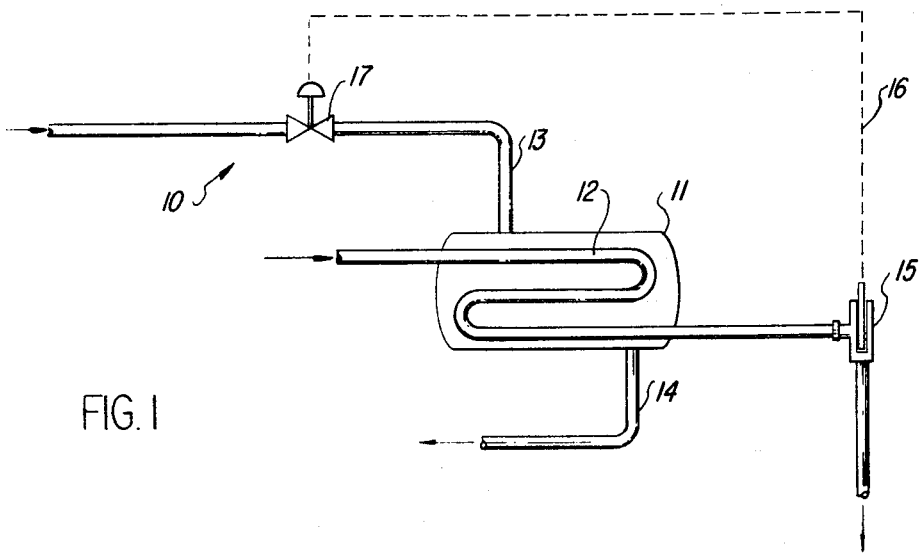
FIG. 1 is a highly schematic view illustrating a system in which the control valve of this invention may be utilized to control the flow of heat transfer fluid to a heat exchanger.

Referring now to the drawings in detail, there is illustrated in FIG. 1 a heat exchange system generally indicated by the numeral 10. The system 10 includes a heat exchanger 11 through which a process fluid is conducted by means of a tube 12. A fluid heat exchange medium, which may be either hot or cold, is conveyed to the heat exchanger 11 by means of an inlet pipe 13, and carried away from the heat exchanger 11 by means of an outlet pipe 14. A sensing device 15, such as a thermostat, is positioned in the process tube 12 downstream of the heat exchanger 11. The sensing device 15 reads the temperature of the process fluid and attempts to maintain it within a desired range by transmitting signals, as illustrated by the dotted line 16, to a control valve 17 positioned in the heat exchanger medium inlet pipe 13. The valve 17, therefore, will control, in response to signals from the sensing device 15, the amount of heat exchange medium conveyed to the heat exchanger 11.

As seen most clearly in FIG. 2, the valve 17 includes a casing 18 having an inlet 19 and an outlet 20. The casing 18 is closed at one end by a fitting 21 which is threadedly secured thereto by screw threads 22. The fitting 21 includes an axially extending threaded bore 23 through which extends a valve stem 24 having a threaded portion 25 which meshes with the threaded bore 23.

The casing 18 further includes an internal wall portion 26 which terminates at its upstream end in an annular shoulder 27. A further recessed wall portion 28 extends from the shoulder 27 toward the inlet 19 of the casing 18.

A flow restricting cylindrical valve body 29, suitably secured to an enlarged head 30 of the valve stem 24, is received in the casing 18. A resilient O-ring 31, re-ceived in the wall portion 26, engages the valve body 29 and provides an effective seal therebetween.

The valve body 29 includes an open end 32 and another end closed by a cover plate 33 having a radially extending peripheral lip 34. As seen in FIG. 2, ports or apertures 35 formed in the valve body 29 permit fluid (as indicated by the arrows F) to flow from the inlet 19, past the lip 34, around an annular flow chamber 6 formed between the valve body 29 and the recessed wall portion 28, through the apertures 35, and out the open end 32 of the valve body 29 to the outlet 20.

As should be readily apparent, rotation of the valve stem 24 will cause the stem 24 and valve body 29 to move axially or linearly relative to the casing 18. As seen in FIG. 2, the valve 17 is fully open with all the apertures 35 in valve body 29 exposed to the flow of fluid. However, the movement of the valve stem 24 to the right will cause some of the apertures 35 to be positioned to the right of the O-ring seal 31 and thus no longer exposed to the flow of fluid. The flow of fluid from the inlet 19 to the outlet 20 will be reduced in proportion to the number of apertures 35, and hence the amount of flow area, no longer exposed to the flow. Further movement of the stem 24 to the right will progressively reduce the flow until the peripheral lip 34 engages the shoulder 27 whereupon the valve 17 is completely closed. The process, of course, can be reversed by moving the stem 24 to the left and thus progressively opening the valve 17. It will be apparent to those skilled in the art that any manner of flow controller may be used to move the stem 24. These may include handwheel, lever, motor, diaphragm, pneumatic or hydraulic operator, or any other normal valve operating device.

Referring now to FIG. 4, it can be seen that the apertures 35 in the expanded or developed condition of the valve body 29 are disposed in five generally horizontal, though somewhat inclined rows of seven apertures each (except for the first row which contains only six apertures). The rows are designated with numerals 36–40, respectively. As can be seen, the apertures 35 in row 36 are of the greatest diameter, and hence of the largest cross-sectional area, with the apertures 35 in each succeeding horizontal or circumferential row 37 through 40 being progressively smaller. It should be apparent, therefore, that the amount of cross-sectional area exposed to the flow will not vary linearly wth the axial movement of the stem 24, but rather will vary exponentially as a function of the length of the axial movement of the stem 24 and valve body 29. By this manner, characteristic flow curves may be obtained simply by varying the configuration of the apertures 35 in accordance with the particular function and characteristic pattern desired. For example, should it be desired to have the flow area vary as a function of the square root of the length of axial movement of the stem, i.e., $A = f\sqrt{L}$, then the valve body 29 would be constructed with the apertures 35 formed therein according to the following table:

| L Inches Total | A Sq. In./Hole Total | Area to be Added/Hole | Hole Dia. | Hole Row |
|---|---|---|---|---|
| 0.1 | 0.316 | θ | 0.6343 | 1 |
| 0.2 | 0.447 | 0.131 | 0.4084 | 2 |
| 0.3 | 0.548 | 0.101 | 0.3586 | 3 |
| 0.4 | 0.633 | 0.085 | 0.3290 | 4 |
| 0.5 | 0.707 | 0.074 | 0.3069 | 5 |
| 0.6 | 0.775 | 0.068 | 0.2942 | 6 |
| 0.7 | 0.837 | 0.062 | 0.2810 | 7 |
| 0.8 | 0.895 | 0.058 | 0.2717 | 8 |

| | | | | |
|---|---|---|---|---|
| 0.9 | 0.949 | 0.054 | 0.2622 | 9 |
| 1.0 | 1.000 | 0.051 | 0.2548 | 10 |
| 1.1 | 1.049 | 0.049 | 0.2498 | 11 |
| 1.2 | 1.095 | 0.047 | 0.2446 | 12 |
| 1.3 | 1.140 | 0.045 | 0.2394 | 13 |
| 1.4 | 1.183 | 0.043 | 0.2340 | 14 |
| 1.5 | 1.225 | 0.042 | 0.2312 | 15 |

Figure 5:
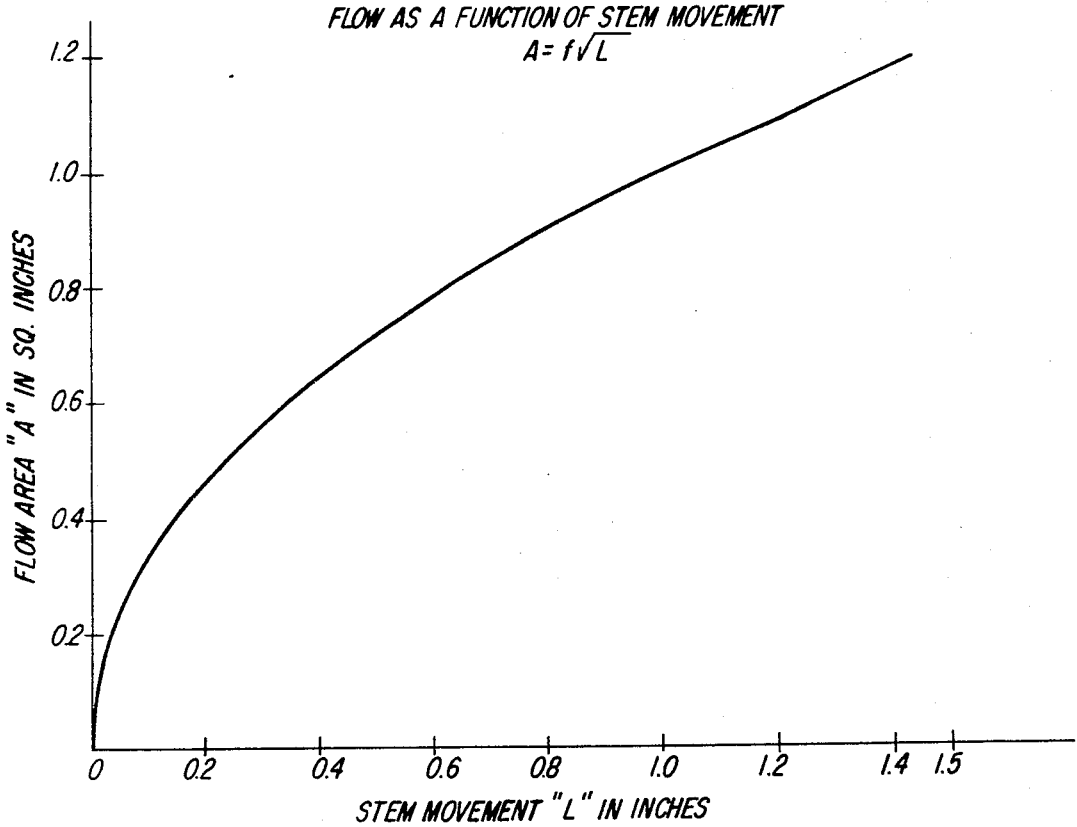
FIG. 5 is a graph illustrating the characteristic curve for a valve having a particular configuration of apertures predetermined as a function of the linear movement of the valve.

The graph illustrated in FIG. 5 depicts the characteristic flow curve obtained with a valve constructed in accordance with the foregoing table. Although the valve body 29 illustrated in FIGS. 2–4 includes only five horizontal or circumferential rows of apertures, 36–40, the total number of rows is, of course, a matter of design choice, with 15 rows being designated in the foregoing table.

Referring again to FIG. 4, it can be seen that the rows 36–40 defined by the apertures 35 are slightly inclined to the horizontal. This is to assure a smooth variation in the flow area as the valve body 29 is moved in and out without having any dead space or non-responsive valve movement. The rows 36–40 are inclined sufficiently so that exposure of the last aperture 35 in one row will overlap with the exposure of the first aperture 35 in the next succeeding row thereby assuring a continuous characteristic flow curve.

In view of the foregoing, therefore, it should be readily apparent that there is provided in accordance with this invention a valve with controlled flow characteristics that may be precisely controlled over a wide range of flow values, and that at the same time is both simple and economical to manufacture. The characterization ports or apertures 35 need only be easily-drilled or punched holes rather than the elaborate shaped and machined orifices of the prior art. Moreover, the simplicity of the design lends itself to reliable operation which results in predictable and repeatable characteristic flow values.

I claim:

1. A flow control valve comprising a casing having a fluid inlet and a fluid outlet, valve means movable in said casing between said inlet and said outlet, said valve means including a cylinder having a closed end and an open end and having apertures formed therein communicating with said open end to define a fluid flow path therethrough, said apertures being arranged in a series of circumferential rows wherein the cross-sectional areas of each of the said apertures in a given row are equal, the total cross-sectional area of the said apertures in a given row being progressively greater than the total cross-sectional area of the said apertures in the preceding rows, said cylinder including a peripheral lip extending radially from said closed end, a shoulder formed internally of said casing providing a seat for said lip, sealing means provided between said cylinder and said casing, the axial movement of said valve means serving to progressively and cumulatively expose each of said rows of apertures to the flow of fluid thereby varying the flow conducting area through said valve, and wherein the locus of all the apertures in a single row defines a plane that is inclined to the axis of movement of said valve in said casing such that the apertures in a single row will be sequentially exposed and the exposure of the last aperture in a particular row will overlap the exposure of the first aperture in the next row whereby a smooth characteristic flow pattern is achieved.

2. A flow control valve as defined in claim 1 wherein said valve means is axially movable in said casing from a fully closed to a fully open position including an infinite number of partially open positions, and wherein said valve means in at least a partially open position is radially spaced from said casing thereby defining an annular flow chamber therebetween.

3. A flow control valve as defined in claim 1 wherein said apertures are circular.

4. A flow control valve as defined in claim 1 wherein said flow conducting area varies directly with the length of said axial movement.

5. A flow control valve as defined in claim 1 wherein said flow conducting area varies as a function of the square root of said axial movement.

6. A flow control valve as defined in claim 1 wherein said flow conducting area varies as a function of the square of said axial movement.

7. A flow control valve as defined in claim 1 wherein said flow conducting area varies as a function of the log of said axial movement.

8. A flow control valve as defined in claim 1 wherein said cylinder is capable of moving over a path substantially equal to its entire length.

9. A flow control valve as defined in claim 1 wherein said cylinder is formed of relatively thin sheet material and said apertures have relatively smooth walls providing minimal resistance to fluid flow.

10. A flow control valve comprising a casing having a fluid inlet and a fluid outlet, valve means movable in said casing between said inlet and said outlet, said valve means including a cylinder having a closed end and an open end and having apertures formed therein communicating with said open end to define a fluid flow path therethrough, said apertures being arranged in a series of circumferential rows wherein the cross-sectional areas of each of the said apertures in a given row are equal, the total cross-sectional area of the said apertures in a given row being progressively greater than the total cross-sectional area of the said apertures in the preceding rows, said cylinder including a peripheral lip extending radially from said closed end, a shoulder formed internally of said casing providing a seat for said lip, sealing means provided between said cylinder and said casing, the axial movement of said valve means serving to progressively and cumulatively expose each of said rows of apertures to the flow of fluid thereby varying the flow conducting area through said valve wherein said flow conducting area varies as a function of the square root of said axial movement.

* * * * *